US008864951B2

(12) United States Patent
Anderson et al.

(10) Patent No.: US 8,864,951 B2
(45) Date of Patent: Oct. 21, 2014

(54) SYSTEMS AND PROCESSES FOR IMPROVING DISTILLATE YIELD AND QUALITY

(75) Inventors: Mark C. Anderson, Spring, TX (US); George R. Winter, Fond du Lac, WI (US)

(73) Assignee: ThioSolv, LLC, Spring Branch, TX (US)

( * ) Notice: Subject to any disclaimer, the term of this patent is extended or adjusted under 35 U.S.C. 154(b) by 603 days.

(21) Appl. No.: 13/050,521

(22) Filed: Mar. 17, 2011

(65) Prior Publication Data

US 2011/0226607 A1    Sep. 22, 2011

Related U.S. Application Data

(60) Provisional application No. 61/340,576, filed on Mar. 19, 2010.

(51) Int. Cl.
| | | |
|---|---|---|
| *B01D 3/26* | (2006.01) | |
| *C10G 7/00* | (2006.01) | |
| *B01D 3/42* | (2006.01) | |
| *B01D 3/32* | (2006.01) | |

(52) U.S. Cl.
CPC ... *B01D 3/42* (2013.01); *B01D 3/32* (2013.01)
USPC ............... 203/40; 203/68; 203/84; 203/98; 202/262; 208/355; 208/358; 196/100

(58) Field of Classification Search
USPC .......... 203/40, 68, 84, 98; 208/184, 308, 347, 208/350, 355, 358; 196/98, 99, 100; 202/158, 161, 262
See application file for complete search history.

(56) References Cited

U.S. PATENT DOCUMENTS

| | | | |
|---|---|---|---|
| 2,963,423 A | 12/1960 | Birchfield | |
| 3,423,308 A | 1/1969 | Murphy | |
| 3,501,400 A | 3/1970 | Brody | |
| 3,811,843 A | 5/1974 | Morfit et al. | |
| 3,846,249 A * | 11/1974 | Merriman | ..................... 196/111 |
| 3,959,419 A | 5/1976 | Kitterman | |
| 4,251,239 A | 2/1981 | Clyde | |
| 4,618,051 A * | 10/1986 | Skraba | ......................... 196/139 |

(Continued)

OTHER PUBLICATIONS

Written Opinion and Search Report of the International Searching Authority dated May 19, 2011 for PCT Patent App. No. PCT/US11/00488.

(Continued)

*Primary Examiner* — Nina Bhat
*Assistant Examiner* — Jonathan Miller
(74) *Attorney, Agent, or Firm* — D'Ambrosio & Menon, PLLC; Usha Menon

(57) ABSTRACT

Systems and processes for improving quality and yield of one or more distillate products generated in a distillation column are disclosed. The system comprises a feed inlet distributor that reduces the amount of liquid entrained in vapor rising from the feed zone of the distillation column, a wash zone collection apparatus having an improved design for collecting slop wax falling from a liquid/vapor contacting structure provided in the wash zone, a recirculation subsystem for recirculating at least a portion of the collected slop wax to the top of the wash zone for distribution as wash oil, and a control subsystem. The feed inlet distributor ensures a horizontal fluid flow path free of transverse surfaces thereby minimizing atomization of liquid droplets entrained in vapor in the feed stream.

7 Claims, 6 Drawing Sheets

(56) References Cited

U.S. PATENT DOCUMENTS

| | | | |
|---|---|---|---|
| 4,621,724 | A | 11/1986 | Godino et al. |
| 4,770,747 | A | 9/1988 | Muller |
| 4,865,697 | A | 9/1989 | Silvey |
| 4,988,434 | A | 1/1991 | Aldridge et al. |
| 5,106,544 | A | 4/1992 | Lee et al. |
| 5,824,194 | A * | 10/1998 | Kruse ............................ 201/29 |
| 6,193,849 | B1 * | 2/2001 | Lockett, Jr. ....................... 203/2 |
| 6,889,961 | B2 | 5/2005 | Laird et al. |
| 7,104,529 | B2 | 9/2006 | Laird et al. |
| 8,202,403 | B2 * | 6/2012 | Sideropoulos et al. ......... 203/40 |
| 8,268,049 | B2 * | 9/2012 | Davydov ....................... 95/199 |
| 2005/0029686 | A1 | 2/2005 | Laird et al. |
| 2007/0163871 | A1 * | 7/2007 | Delatour ....................... 202/158 |
| 2007/0203375 | A1 | 8/2007 | Yang et al. |
| 2008/0314729 | A1 * | 12/2008 | Sideropoulos et al. ......... 203/40 |

OTHER PUBLICATIONS

Kumar, Rajeev; Chithra, V.; Gupta, Shalini; Maheshwari, Sonal; Reddy, Rao, V.C.; Choudary, C.V.; "Maximization of VGO through Deep Cut Distillation for Refinery Margins;" Petroleum Technology Quarterly (PTQ) Q1 2011; pp. 87-91.

Pilling, Mark; Roza, Mario; Wong, S.M.; "Entrainment Issues in a Vacuum Column Flash Zones;" Petroleum Technology Quarterly (PTQ) Q1 2010; pp. 57-65; Sulzer Chemtech, USA.

Singh, D. "Meeting Diesel Specifications at Sustained Production;" Hydrocarbon Processing, Apr. 2011; pp. 79-83.

"Tower Technical Bulletin: Maximizing Diesel Recovery in Your Columns;" Hydrocarbon Processing, Apr. 2011; Sulzer Chemtech USA; Humble, Texas.

\* cited by examiner

SYSTEMS AND PROCESSES FOR IMPROVING DISTILLATE YIELD AND QUALITY

CROSS-REFERENCE TO RELATED APPLICATION(S)

This application claims priority under 35 U.S.C. §119(e) to U.S. Provisional Patent Application Ser. No. 61/340,576 filed on Mar. 19, 2010, which is incorporated herein by reference in its entirety.

BACKGROUND

Various technologies and techniques exist for separating mixtures of liquids into their individual components. Distillation—specifically fractional distillation—is the most common form of separation technology used in the chemical process industries and is a critical part of petroleum refining, petrochemical and chemical production, and natural gas processing. Oil refineries, for example, employ fractional distillation to separate crude oil into useful components comprised of different hydrocarbons with different boiling points.

SUMMARY

Systems and processes for improving the yield and quality of distillate obtained from fractionation of black oil streams are disclosed. Embodiments of the invention relate to structural and design improvements to distillation columns as well as distillation process improvements that generate significant advantages over conventional systems and processes.

Throughout this entire disclosure, including the detailed description and the claims, "a portion of" a substance may refer to an entire amount of the substance or any lesser amount thereof.

According to an embodiment of the invention, a system for improving yield and quality of one or more distillate products generated in a distillation column is disclosed. The distillation column comprises a feed zone, a wash zone located above the feed zone, and a fractionation zone located above the wash zone. The wash zone has disposed therein a liquid/vapor contacting structure a wash oil distributor for distributing wash oil to the contacting structure.

The system according to the above-described embodiment of the invention comprises a feed inlet distributor that reduces an amount of liquid entrained in a vapor rising from the feed zone, a wash zone collection apparatus having an improved design for collecting slop wax falling from the wash zone, a recirculation subsystem for recirculating a portion of the slop wax withdrawn from the wash zone collection apparatus, and a control subsystem for controlling other subsystems.

The recirculation subsystem comprises a pump, a first conduit for conducting collected slop wax from the wash zone collection apparatus to the pump, a second conduit for recirculating a portion of the pumped slop wax to the wash oil distributor for distribution as wash oil to the contacting structure, and a third conduit for conducting a portion of the pumped slop wax to equipment located externally to the distillation column.

The control subsystem may comprise means for controlling a flow rate of the recirculated portion of the pumped slop wax and means for controlling a flow rate of the portion of the pumped slop wax conducted to the external equipment.

In accordance with one or more embodiments of the invention, the recirculation subsystem may further comprise a means for combining a portion of a distillate product collected by a distillate product collector disposed in the fractionation zone with the recirculated portion of the slop wax to form a combined stream that is conducted to the wash oil distributor for distribution as wash oil to the contacting structure. The slop wax recirculation rate in embodiments of the invention is several times higher than the wash oil rate in conventional apparatuses, and as such, the rate at which distillate product, if any, is conducted to the distributor is a small fraction of the rate required in conventional apparatuses to remove liquid entrained in vapor passing through the wash zone.

In certain embodiments of the invention, the system may further comprise an insulating apparatus comprising one or more insulating materials applied to the distillate product collector to reduce condensation of vapor on a bottom surface thereof.

According to one or more embodiments of the invention, the wash zone collection apparatus comprises one or more transverse collector troughs inclined towards an opening that provides for fluid communication with the recirculation subsystem and a plurality of lateral troughs disposed in two or more layers and inclined towards the one or more transverse collector troughs, wherein the lateral troughs of each layer are staggered with respect to the lateral troughs of an adjacent layer.

According to one or more embodiments of the invention in which the distillation column includes a tangential feed entry nozzle, a tangential feed inlet distributor is provided that comprises a horizontally disposed annular ring extending around an entire circumference of the circumferential wall of the distillation column, and a cylindrical skirt connected to an inner edge of the annular ring and extending downward therefrom. The annular ring, the cylindrical skirt, and the circumferential wall of the distillation column together define an open-bottomed tunnel within the distillation column into which the fluid feed stream is injected or channeled via the tangential feed inlet. The tunnel is free of any surface transverse to the substantially tangential flow path of the fluid feed stream thereby reducing atomization of entrained liquid in the fluid feed stream.

In alternative embodiments of the invention in which the feed entry nozzle is radial to the distillation column, a radial feed inlet distributor is provided that comprises a roof plate that extends substantially across an entire diameter of the distillation column and a skirt comprising opposing walls laterally spaced from each other about a distance equal to a diameter of the feed inlet and extending downwards from the roof plate about a distance equal to the diameter of the feed inlet. The opposing walls of the skirt may terminate prior to reaching a distal end of the circumferential wall of the distillation column. The roof plate and the opposing walls of the skirt together define an open-bottomed tunnel within the distillation column into which the fluid feed stream is injected or channeled via the radial feed inlet.

The radial feed inlet distributor further comprises a feed splitter provided in proximity to where the opposing walls of the skirt terminate, the feed splitter splitting the fluid feed stream bilaterally into two smaller fluid feed streams directed in opposing horizontal directions and along flow paths substantially tangential to the circumferential wall of the distillation column. The tunnel is free of any surface transverse to the initial radial flow path of the fluid feed stream or the horizontal tangential flow paths of the smaller fluid feed streams thereby reducing atomization of entrained liquid in the fluid feed stream.

According to an embodiment of the invention, a process for improving quality and yield of one or more distillate products generated in a distillation column is disclosed. The process comprises: providing a tangential or radial feed inlet distributor within the distillation column in dependence on whether the feed inlet is tangential or radial to the column, collecting slop wax falling from the contacting structure using a wash zone collection apparatus disposed in the wash zone, and recirculating a portion of the slop wax to the wash oil distributor for distribution as the wash oil to the contacting structure. In a more specific embodiment, the process further comprises conducting collected slop wax from the wash zone collection apparatus to a pump, recirculating a portion of the pumped slop wax to the wash oil distributor, and conducting a portion of the pumped slop wax to equipment located externally to the distillation column.

The process may further comprise combining a portion of distillate product collected by a distillate product collector disposed in the fractionation zone with the recirculated portion of the slop wax to form a combined stream, conducting the combined stream to the wash oil distributor, and distributing the combined stream as the wash oil to the contacting structure. In certain embodiments, the process may additionally comprise applying one or more insulating materials to the distillate product collector to reduce condensation of vapor on a bottom surface thereof.

These and other embodiments of the invention are described in further detail through reference to the following drawings in the detailed description that follows.

DETAILED DESCRIPTION

Figure 1:
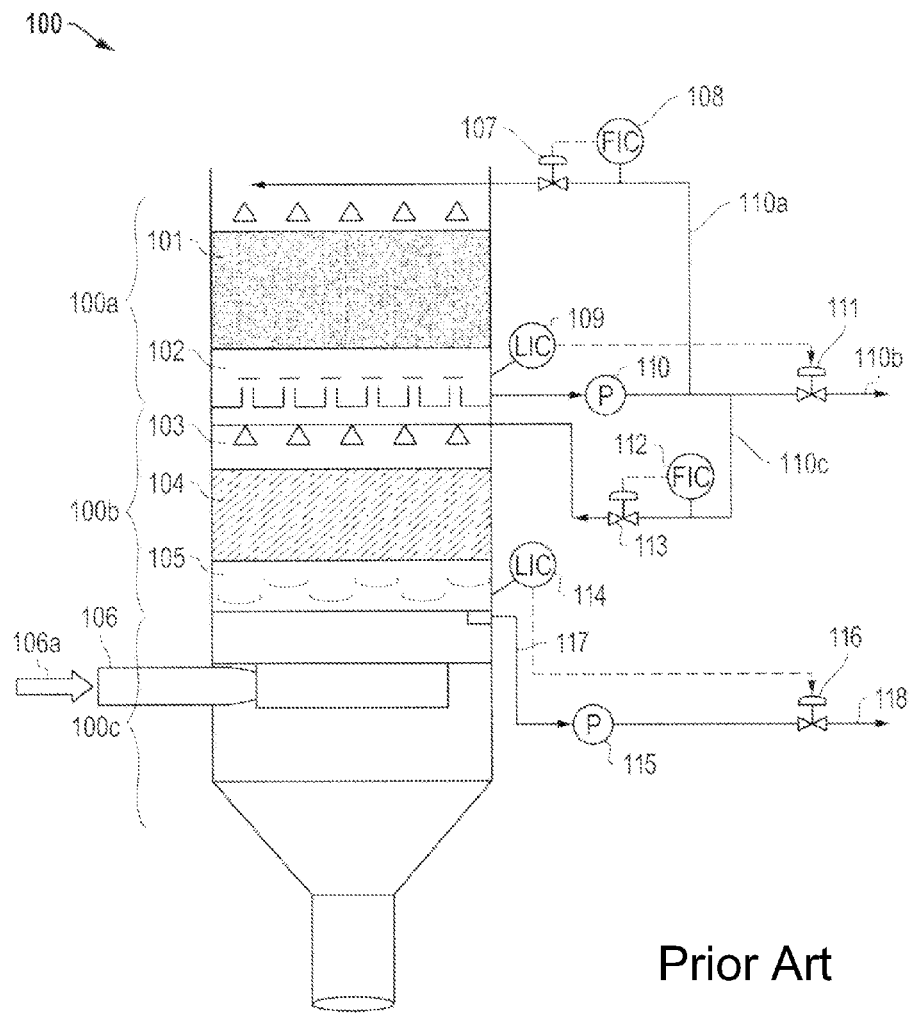
FIG. 1 is a schematic representation of a conventional distillation system.

Systems and processes disclosed herein are applicable to a wide range of petroleum refining processes (e.g. atmospheric distillation of crude oil, vacuum distillation of reduced crude, fractionation of effluent from pyrolysis furnaces), and may be employed, for example, in the main columns of Delayed Coking, Fluid Catalytic Cracking and Residue Hydrotreating Units. Moreover, systems and processes according to embodiments of the invention may also be used in connection with numerous other industry recovery processes such as, for example, tar sands bitumen and coke oven distillate recovery.

Although the invention will be described primarily through reference to embodiments involving the processing of reduced crude, it should be noted that the invention is not limited to such embodiments, and, as noted above, systems and processes of the invention are applicable to any distillation process in which the column feed is at least partially vaporized and comprises non-volatile components which, if allowed to contaminate the distillate, are deleterious to its subsequent processing. More specifically, embodiments of the invention are applicable to distillation columns that process feed streams that include components that are not volatile under process conditions (e.g. asphaltenes and organometallic compounds), but which, if allowed to contaminate the distillate by entrainment of liquid droplets in the vapor rising from the feed inlet point, discolor the distillate and produce significant adverse effects on the activity and selectivity of catalysts used in connection with further processing of the distillate.

One of the first process units that crude oil enters for processing is the Atmospheric Crude Fractionating Column (hereinafter "Crude Unit"). The reduced crude obtained from this process is typically further distilled in a fractionating column operating under sub-atmospheric pressure (a Vacuum Crude Fractionating Unit or more commonly known as a "Vacuum Unit") to separate additional distillate from the heavier fraction that contains essentially all metals and asphaltenes present in the crude oil. The vacuum distillate recovered from the Vacuum Crude Fractionating. Unit is generally converted to more valuable products by downstream processes such as Fluid Catalytic Cracking, Hydrotreating, and Hydrocracking. Those processes employ catalysts whose activity and selectivity are reduced by the presence of metals and asphaltenes in the vacuum distillate. Accordingly, a strong economic incentive exists for minimizing the entrainment of liquid containing those contaminants in the distillate product.

Although embodiments of the invention are discussed primarily in connection with the processing of a feed stream fed to a Vacuum Unit in which the operating pressure is low, the feed inlet velocities and vapor upflow are high, and the liquid entrainment in the vapor stream is especially severe, the operating principles and advantages of embodiments of the invention are applicable to any distillation system and process in which it is desirable to prevent liquid entrainment in the vapor phase rising from the feed point.

FIG. 1 depicts a sectional view of a portion of a conventional Vacuum Unit distillation column and accompanying elements disposed externally to the column. The column 100 includes a packed Heavy Vacuum Gas Oil (HVGO) section 101 where HVGO product, typically boiling between 650° F. and 1050° F., is condensed from the vapor rising through the column. Located below the HVGO section 101 is a draw tray 102 for collecting the condensed HVGO product. An HVGO pump 110 recirculates at least a portion of the collected HVGO product back to the HVGO section 101 through conduit 110a. Flow controller 108 is provided for controlling a flow rate of the recirculated HVGO product through conduit 110a via valve 107. Pump 110 also pumps at least a portion of the collected HVGO product through conduit 110b for further processing, for example, in a FCC Unit or a Hydrocracking Unit. Level controller 109 is provided for controlling a flow rate of distillate through conduit 110b via valve 111. Further, in conventional distillation apparatuses such as that shown in FIG. 1, the HVGO pump 110 additionally pumps a significant portion of the collected HVGO product through conduit 110c for use as wash oil in wash zone 100b.

The portion of the distillation column 100 depicted in FIG. 1 can be segmented into three zones. A fractionation zone 100a encompasses the HVGO section 101 and the draw tray 102. The wash zone 100b encompasses a region of the column extending between the bottom of draw tray 102 and the bottom of a collection tray 105. The feed zone (or flash zone) 100c encompasses a region of the column between the bottom of collection tray 105 and a position in relative proximity to the feed inlet 106 to the column.

A fluid feed stream 106a generally enters the vacuum column 100 from a fired heater and comprises mostly vapor by weight and almost all vapor by volume. As a result of the high feed stream velocities in the feed conduit from the heater to the column, a mist flow is generated with liquid entrained as small diameter droplets within the vapor. In the feed zone 100.c, a portion of the liquid phase in the feed stream 106a falls out of the rising vapor of the stream by gravimetric separation alone. In the wash zone 100b, entrained liquid droplets are removed from the rising vapor of the feed stream 106a by scrubbing the vapor with a liquid wash oil) while using trays or packing to enhance liquid/vapor contact.

In conventional apparatuses, a portion of the heaviest distillate product—obtained by condensation in the fractionation zone located just above the wash zone—serves as the sole source of the wash oil used to remove entrained liquid droplets from the vapor rising through the wash zone. For example, in a conventional vacuum column such as that depicted in FIG. 1, a significant portion of the heaviest distillate product (i.e. the condensed HVGO product collected by draw tray 102) is pumped by HVGO pump 110 to the wash zone 100b via conduit 110c for use as wash oil. Valve 113 controls the flow rate of the wash oil in response to a signal communicated by flow controller 112. The wash oil is supplied to one or more liquid distributors 103 provided at a top portion of packing 104 in the wash zone 100b. As vapor in the fluid feed stream 106a rises upwards in the column 100 through the packing 104, the vapor is scrubbed with the wash oil leading to removal of a portion of the liquid entrained in the vapor.

A collection tray 105 is provided at the bottom of the wash zone 100b to collect liquid falling from the packing 104. This liquid, also known in the art as slop wax, is then conducted through conduit 117 to pump 115. A level controller 114 is provided to determine an amount of slop wax that has accumulated in the collection tray 105 and communicate a signal to valve 116 which controls the flow of slop wax through to fluid line 118. The slop wax is carried through fluid line 118 to further blending or recycling treatment systems. However, certain conventional distillation apparatuses do not include a slop wax collection tray or the associated pump and instead allow the slop wax to fall past the feed zone to combine with the bottoms product from the column.

There are several drawbacks to conventional distillation apparatuses that utilize a significant portion of the heaviest distillate product as wash oil for removing liquid droplets entrained in vapor rising through the wash zone. First, the use of distillate product as wash oil clearly decreases the yield of distillate, which is substantially more valuable than the bottoms product. The significant economic costs associated with the use of distillate as wash oil creates a strong incentive to minimize the amount of the distillate used. This is typically accomplished by minimizing the rate at which distillate is provided as wash oil to the wash zone.

However, minimization of the wash oil rate is subject to the constraint that the rate must be high enough to provide wetting of the packing sufficient to limit coke formation to an economically acceptable rate. In order to prevent the development of unwetted areas in the packing 104 where coke can accumulate, the flow rate of wash oil distributed to the top of the wash zone 100b in conventional apparatuses must be sufficient to maintain the packing 104 in a thoroughly wetted condition, particularly, a bottom portion of the packing which is especially prone to coke accumulation. The need to maintain a sufficiently high wash oil flow rate so as to both capture entrained liquid and reduce/minimize coking runs counter to the strong financial incentive to minimize the wash oil rate to obtain greater distillate yields.

Experimental and operational data has shown that lower liquid flow rates over the wash zone packing as well as poorer liquid distribution across the packing leads to an increase in coke deposition and accumulation rates. Moreover, the accumulation of coke deposits on the packing reduces the efficiency of entrained liquid removal from the vapor rising through the packing. In fact, there exists a threshold level of coke accumulation at which the efficiency of entrained liquid removal is reduced to such an extent that the distillation unit must be shut down and the packing disassembled and cleaned of the coke. The resultant downtime caused by this coke removal maintenance operation comes at an enormous economic cost to the refinery, particularly when the process unit that is being shut down affects the operation of valuable downstream units.

To balance the competing objectives of capturing entrained liquid from the vapor rising through the column, minimizing loss of distillate yield, and maintaining wash zone packing in a sufficiently wetted condition so as to prevent excess accumulation and deposition of coke, those of ordinary skill in the art have chosen to direct their efforts at modifying the mechanical design of the packing and the mechanism by which wash oil is distributed onto the packing. Efforts have also been focused on modifying the geometry of internal structures within the feed zone with the avowed aim of achieving a uniform velocity of the rising vapor across the cross section of the column prior to reaching the wash zone.

To assist in these efforts, those skilled in the art have employed sophisticated Computational Fluid Dynamics ("CFD") programs to design feed inlet devices that attempt to uniformly distribute the vapor flowing up through the column. In addition, efforts have also focused on designing beds of structured packing and distributors that attempt to minimize the amount of liquid wash necessary to remove entrained liquid from the vapor while still preventing excess accumulation of coke. These efforts, however, have resulted in an only marginal reduction in the amount of distillate that roust be supplied to the wash zone as wash oil in order to maintain the sufficiently high liquid flow rates required to remove entrained droplets from the vapor and to prevent excess accumulation of coke in the wash zone packing.

Systems and processes according to embodiments of the invention eliminate the tension present in the operation of conventional apparatuses between preventing excess coke accumulation in the packing and minimizing loss of distillate yield. Embodiments of the invention are directed to novel systems and processes that contradict conventional wisdom in the art and essentially eliminate both the loss of distillate yield and the excess accumulation of coke in the wash zone packing that occurs in conventional systems while achieving essentially complete removal of entrained liquid from the vapor rising through the wash zone.

According to one or more embodiments of the invention, a system for improving quality and yield of one or more distillate products generated in a distillation column is disclosed. The distillation column comprises a feed zone, a wash zone located above the feed zone, and a fractionation zone located above the wash zone.

The wash zone has disposed therein a liquid/vapor contacting structure and a wash oil distributor that distributes a liquid stream onto the liquid/vapor contracting structure without producing fine droplets that can become entrained in the vapor rising through the distillate collector into the fractionation zone. The contacting structure may comprise trays or packing that enhance liquid/vapor contact to reduce an amount of liquid entrained in vapor rising through the wash zone. The system further comprises a feed inlet distributor that reduces an amount of liquid entrained in a vapor stream rising through the wash zone, a wash zone collection apparatus having an improved design for collecting slop wax falling from the contacting structure, a recirculation subsystem, and a control subsystem. The recirculation and control subsystems will be described in more detail through reference to FIG. 2, the wash zone collection apparatus through reference to FIGS. 3A-3C, and the feed inlet distributor through reference to FIGS. 4A-5B.

A key feature of the recirculation subsystem is the recirculation or recycling of at least a portion of the slop wax collected by the wash zone collection apparatus back to the top of the wash zone for use as wash oil. Because of its high metals and asphaltene content; those skilled in the art have not previously considered the benefits of recycling collected slop wax to the top of the wash zone for use as wash oil. In fact, conventional wisdom has repeatedly taught away from recycling the black, viscous slop wax to the top of the wash zone for use as wash oil based on the belief that use of the slop wax would result in poor liquid distribution throughout the packing and the development of dry sections vulnerable to coke accumulation. In conventional systems, this collected liquid is either combined with the bottoms product or recycled to the charge heater.

Applicants recognized—contrary to the pervasive teachings of the prior art—that slop wax recirculation in accordance with embodiments of the invention in fact minimizes coke accumulation by allowing for high wash oil rates that are not economically feasible when distillate alone is used as the wash oil. By virtue of the recirculation of slop wax to the top of the wash zone for use as wash oil in accordance with embodiments of the invention, distillate is no longer used as a primary source for the wash oil, if at all, and significantly higher distillate yields are obtained. Moreover, as will be described in greater detail hereinafter, minimizing the wash oil flow rate is no longer a consideration in embodiments of the invention, and as a result, greater entrained liquid removal rates and lower coke accumulation rates are observed as compared to conventional apparatuses.

Figure 2:
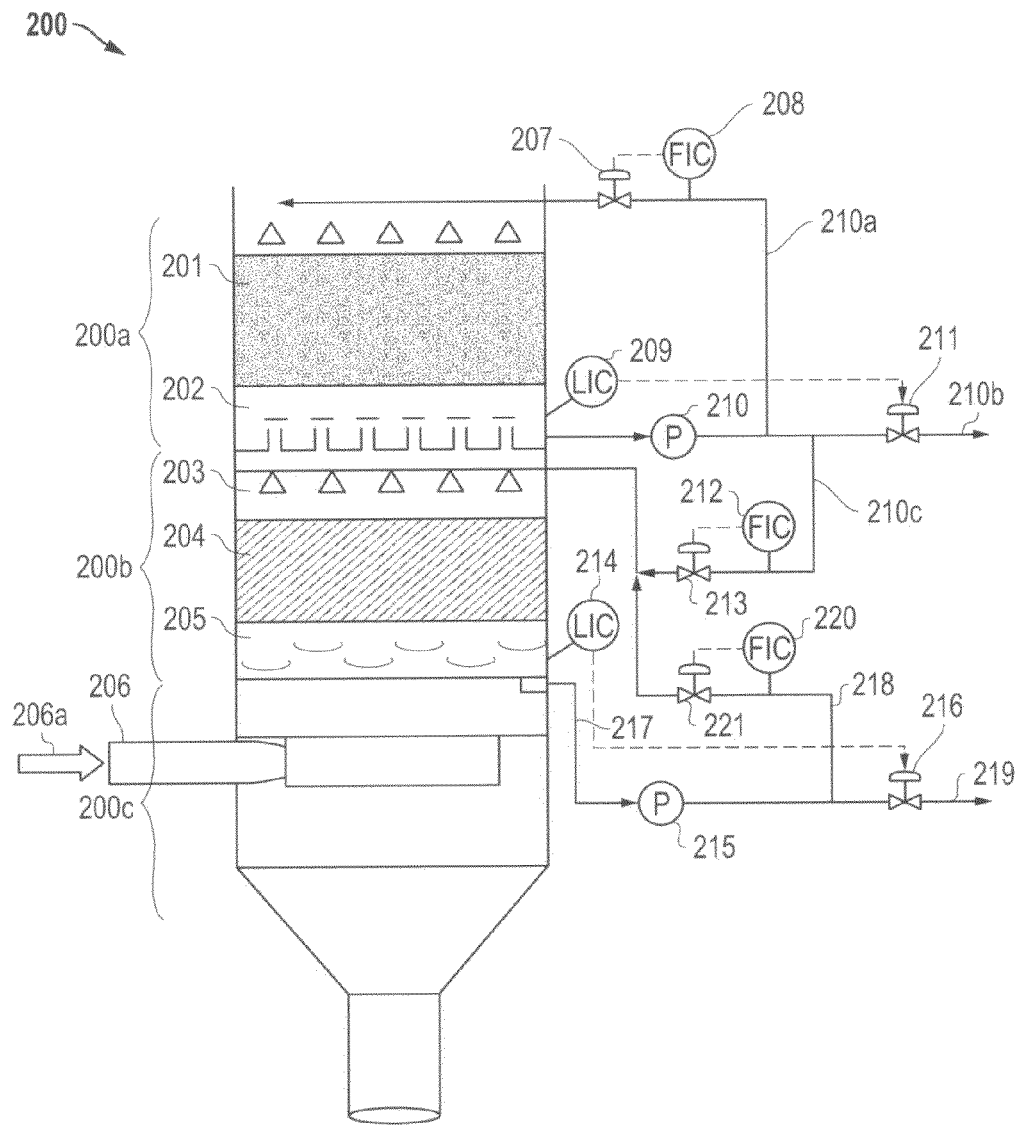
FIG. 2 is a schematic representation of a system in accordance with one or more embodiments of the invention.

FIG. 2 depicts a sectional view of a portion of a distillation column 200 and elements external thereto in accordance with one or more embodiments of the invention. Any elements shown in FIG. 2 that are not separately described through reference to FIG. 2 perform functions similar to corresponding elements described through reference to FIG. 1. The distillation column comprises a fractionation zone 200a, a wash zone 200b located below the fractionation zone 200a, and a feed zone 200c located below the wash zone 200b. The wash zone has disposed therein a liquid/vapor contacting structure 204 and a wash oil distributor 203 for distributing wash oil to the contacting structure 204.

Still referring to FIG. 2, the system according to embodiments of the invention includes a feed inlet distributor (not shown), a wash zone collection apparatus 205 disposed in the wash zone 200b for collecting slop wax falling from the contacting structure 204, a recirculation subsystem, and a control subsystem.

The recirculation subsystem comprises conduit 217 for conducting collected stop wax from the wash zone collection apparatus 205 to pump 215. The recirculation subsystem further comprises conduit 218 for recirculating a portion of the slop wax pumped from pump 215 to the wash oil distributor 203 for distribution as wash oil to contacting structure 204, and conduit 219 for conducting a portion of the pumped slop wax (i.e. that portion not recirculated to the top of the wash zone) to external equipment for further treatment (e.g. the inlet of a charge heater) or for commingling with the heavy liquid bottoms product.

The portion of the slop wax recirculated through conduit 218 and the portion of the slop wax conducted through conduit 219 together constitute a total amount of slop wax pumped from the wash zone collection apparatus 205. In one or more embodiments of the invention, the portion of the slop wax recirculated through conduit 218 represents a majority of the slop wax pumped from the wash zone collection apparatus 205. Corrosion inhibitors and/or anti foulants may in certain embodiments be added to the recirculated portion of the slop wax or to other system streams.

The control subsystem according to embodiments of the invention may comprise a level controller 214 that determines an amount of slop wax that has accumulated in the wash zone collection apparatus 205 and communicates a signal to valve 216 to control the flow of that portion of the slop wax conducted through conduit 219 to further blending or recycling treatment systems. The control subsystem may further comprise flow controller 220 that communicates a signal to valve 221 for controlling a flow of the recirculated portion of the slop wax through conduit 218. In alternate embodiments of the invention, the flow of that portion of the slop wax conducted through conduit 219 may be controlled by a flow controller.

It should be noted that the invention is not limited to the particular arrangement shown in FIG. 2 and that numerous other configurations and arrangements are within the scope of the invention. For example, in accordance with one or more additional embodiments of the invention, the wash zone 200b may comprise one or more wash zone sections and the slop wax that is recycled to the top of the wash zone 200b for use as wash oil may be obtained from anywhere in the wash zone 200b below the wash column inlet through which wash oil is supplied to the wash zone 200b. Each wash zone section may comprise a contacting structure, a distributor provided above the contacting structure for distributing wash oil to the contacting structure, a wash zone collection apparatus provided below the contacting structure for collecting slop fax falling from the contacting structure, and a means for recirculating a portion of the collected slop wax to the distributor in the same wash zone section for distribution as wash oil.

In contrast to the streams of HVGO and Light Vacuum Gas Oil (LVGO) product that are typically recirculated back to the HVGO and LVGO sections of a vacuum column, respectively, the removal of heat from that portion of the slop wax that is recirculated from the wash zone collection apparatus 205 to the top of the wash zone 200b is neither necessary nor desired in embodiments of the invention. Because no thermal energy is removed from the recirculated slop wax, condensation of vapor flowing up through the wash zone 200b from the feed zone 200c does not occur.

The contacting structure 204 may comprise one or more types of packing material including one or more trays, one or more beds of loose packing, and/or one or more layers of structured packing. As previously noted, the goal of packing designers has heretofore been to design packing that minimizes the wash oil rate necessary to obtain desired entrained liquid removal rates while maintaining the packing in a sufficiently wetted condition, because increased use of wash oil in conventional distillation systems equates to an increase in the loss of valuable feed to downstream processes.

In contrast, according to embodiments of the invention, the contacting structure 204 can be subjected to significantly higher liquid flow rates because the wash oil comprises primarily, if not solely, recirculated slop wax rather than expensive distillate, and is thus much less sensitive to the performance of the wash oil distributor. Moreover, due to the high liquid flow rate, the contacting structure 204 is more resistant to the channeling of vapor that conventional designs are prone to and which has been known to produce dry areas vulnerable to coke accumulation. The contacting structure 204 according to embodiments of the invention is liberally flushed with liquid that captures—as it falls through the contacting structure—liquid entrained in vapor rising through the wash zone. Thus, the contacting structure 204 remains clean and functional for longer periods of time than in conventional systems.

The distributor in conventional systems is designed and sized so as to function with only a small flow rate of wash oil to the packing. In embodiments of the invention, however, it is economically feasible to maintain wash oil flow rates that are several times higher than in conventional systems, and thus the ability of the wash oil distributor to uniformly distribute wash oil to the contacting structure is not a significant concern. As such, the distributor 203 according to embodiments of the invention need not be designed for maintaining a uniform distribution of a low flow density of liquid, but instead may be designed for complete wash oil cross-sectional coverage of the contacting structure 204 by a relatively high wash oil flow rate. For example, the wash oil distributor 205 may comprise robust spray nozzles or even overflow troughs capable of high liquid flow rates. Applicants have recognized that modern spray nozzles with large openings and modern trough distributors may advantageously be employed as they are able to handle liquids containing considerable suspended solids. Further, according to embodiments of the invention, the liquid flow density through the contacting structure 204 is sufficient to carry out any suspended solids. Moreover, the distributor 204 is specifically designed to distribute a liquid stream onto the liquid/vapor contracting structure without producing fine droplets that can be entrained in the vapor rising through the distillate collector into the fractionation zone.

Applicants have determined that an amount of liquid that remains entrained in the upward flowing vapor after scrubbing with wash oil is inversely related to the wash oil flow rate per unit of cross-sectional area of the packing. Experimental testing has confirmed that the increased wash oil flow rates capable of being maintained in embodiments of the invention are accompanied by only a negligible (if any) loss of distillate and result in considerably less entrained heavy material appearing in the distillate product than in conventional systems. Because embodiments of the invention decouple the wash oil flow rate from the loss of valuable distillate, almost all of the material condensed in the HVGO section 201 can be recovered as HVGO product essentially free of asphaltenes and non-volatile organometallic compounds. A prohibitively expensive amount of distillate yield would need to be sacrificed in conventional systems in order to obtain theoretically high enough wash oil flow rates to produce entrained liquid removal rates comparable to those obtained in embodiments of the invention.

In order to, for example, limit the concentration of entrained liquid in the portion of the slop wax that is recirculated back to the top of the wash zone for use as wash oil, in certain embodiments of the invention, the recirculation subsystem may further comprise a means for combining a portion of a distillate product collected by distillate product collector 202 with the portion of the slop wax recirculated through conduit 218. More specifically, a portion of the distillate pumped from pump 210 may be diverted through conduit 210*c* and combined with the recirculated portion of the slop wax via a juncture between conduit 218 and conduit 210*c*. Flow of the distillate product through conduit 210*c* may be controlled by flow controller 212 which communicates a signal to valve 213. In alternate embodiments of the invention, flow of the distillate through conduit 210*c* may be controlled by level controller 214. In those embodiments of the invention in which a portion of the collected distillate is combined with the recirculated portion of the slop wax, the amount of distillate added is miniscule compared to conventional designs. For example, in one or more embodiments of the invention, the amount of distillate added to the wash oil may constitute about ten percent or less of the wash oil by weight.

During experimentation, Applicants unexpectedly observed that even when the addition rate of collected distillate to the wash oil was reduced to zero, slop wax continued to be pumped from the wash zone collection apparatus 205 and the portion of the slop wax recirculated back to the top of the wash zone 200*b* for use as wash oil was more dilute than necessary to ensure complete capture of the entrained liquid in the vapor rising through the wash zone 200*b*.

Applicants reasoned that because there is no significant change in temperature across the wash zone 200*b* in embodiments of the invention, the temperature at the top of the wash zone 200*b* was higher than the temperature of the distillate product collected in the distillate product collector 202. Applicants further reasoned that this temperature differential was causing hot vapor rising past the wash zone 200*b* to condense on the bottom of the relatively cool distillate product collector 202 (e.g. HVGO draw tray) thereby diluting the recirculated slop wax more than necessary to ensure capture of essentially all liquid entrained in the rising vapor. That is, the small amount of heat transfer across the distillate product collector 202 is more than sufficient to provide the small amount of liquid that may be necessary to dilute the wash oil in order to remove all entrained material in the vapor rising through the wash zone.

Accordingly, based on these observations, the system according to embodiments of the invention may further comprise an insulation apparatus comprising one or more insulating materials applied to a surface of the distillate product collector 202. The one or more insulating materials may comprise a castable refractory applied to an upper surface of a floor of the distillate product collector 202 in order to reduce condensation of vapor on a bottom surface of thereof. This reduction in vapor condensation may in turn require the addition of a very small amount of collected distillate to the recirculated slop wax in order to keep the concentration of captured entrained liquid in the wash oil low enough for the wash oil to continue to be effective in removing essentially all of the entrained liquid from the rising vapor.

Of particular advantage is that the addition of one or more insulating materials to the distillate product tray coupled with the addition of a small amount of the collected distillate to the wash oil may in certain embodiments produce a greater distillate product yield than if the distillate product collector is not insulated and no collected distillate is added to the wash oil. That is, because the flow of make-up distillate necessary to sustain the performance of the wash zone generally, and the wash oil in particular, may be less than the amount of distillate condensed on a bottom surface of the distillate product collector, the distillate yield may in fact be maximized by insulating the distillate product collector 202 immediately above the wash zone 200*b*. Reducing the amount of condensation on the underside of the distillate product collector 202 reduces the uncontrolled loss of potential distillate to the recirculated wash oil and transfers control of the dilution of the wash oil with collected distillate product to flow controller 212.

In one or more exemplary embodiments of the invention, an operating ratio of 19:1 recycled wash oil to fresh distillate results in effective removal of entrained liquid from the rising vapor while providing ease of control. According to an exemplary process of the invention, initially fresh distillate alone is provided as wash oil to the wash zone. Subsequently, the amount of distillate added to the wash oil is progressively reduced while the rate at which collected slop wax is recycled to the wash zone is concomitantly increased. The addition rate of distillate to the wash oil may be adjusted based on: (1) the rate of dilution needed to keep the collected slop wax pumpable, and/or (2) the amount of fresh distillate required to maintain essentially complete capture of the entrained liquid from the rising vapor.

Applicants conducted an experiment that compared the distillate yields obtained by a conventional distillation system and a system in accordance with an embodiment of the invention. The 95% distillation point for the conventional distillation system based on the industry standard ASTM Method D-1160 distillation of HVGO product was 1050° F. However, after modifications were made to the conventional system to produce a system in accordance with an embodiment of the invention, the 95% distillation point of the HVGO product increased to 1250° F. and the distillate obtained was almost completely free of contamination by entrained feed liquid.

It is known in the art that conventional vacuum distillation units are incapable of yielding an HVGO product with the 95% distillation point higher than 1050° F. without increasing the charge heater outlet temperature to such an extent that excessive coking of the charge heater and cracking of the feed stream results. Applicants unexpectedly determined that the 200° F. increase in the 95% distillation point obtained by the system of the invention resulted in an increase in the HVGO product yield by about 5% of the fluid feed stream to the column. If the distillate yield is supplied as feed to an FCC unit, for example, it is estimated that this increase in the distillate yield can potentially increase refinery profit by US$110 per incremental barrel of FCC feed. To provide context for this estimation, the spot market price of West Texas Intermediate crude oil was approximately US$90/barrel at the time the estimate was made.

Figure 6:
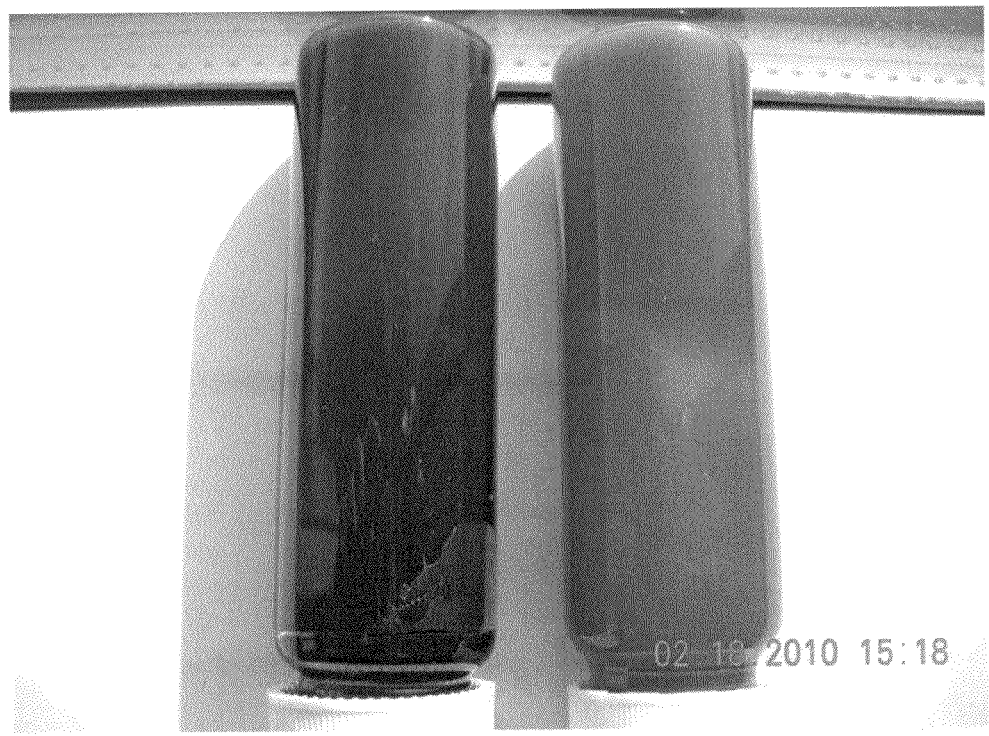
FIG. 6 is a photograph of two samples of HVGO product obtained by the experimental testing.

FIG. 6 is a photograph showing two samples of HVGO product obtained by the experimental testing described above. The sample on the left is one obtained using a conventional apparatus and the sample on the right is one obtained in the same vacuum column using a system in accordance with an embodiment of the invention. As is evident, the sample on the right is almost completely free of darkening by the black entrained feed liquid. In addition, the sample on the right has a much higher end point (about 1250° F.) than the sample on the left (1050° F.) corresponding to about a 5% increase in distillate yield.

In addition to the recycling of slop wax for use as wash oil, another novel aspect of systems according to embodiments of the invention is the design and structure of the wash zone collection apparatus.

Figure 3A:
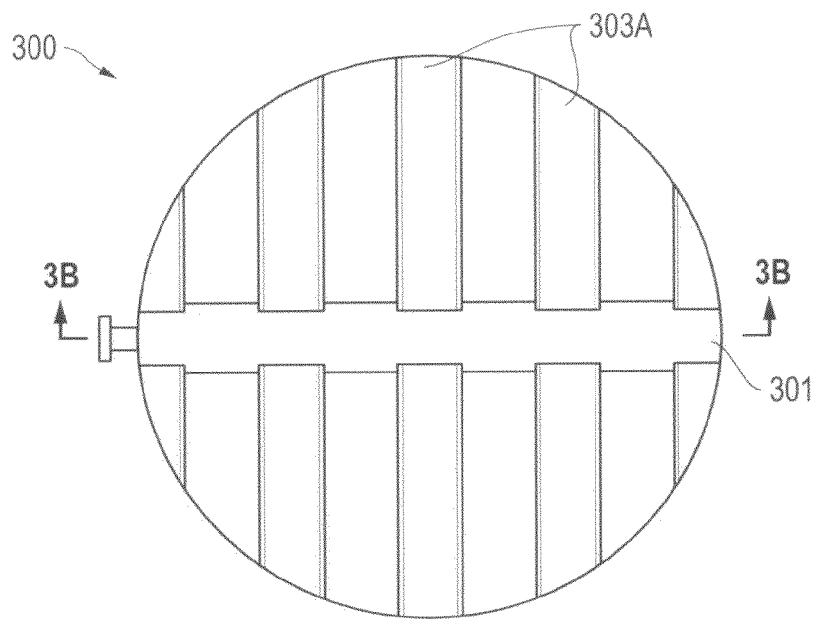
FIGS. 3A-3C depict various plan and/or sectional views of a wash zone collection apparatus in accordance with one or more embodiments of the invention.
Figure 3B:
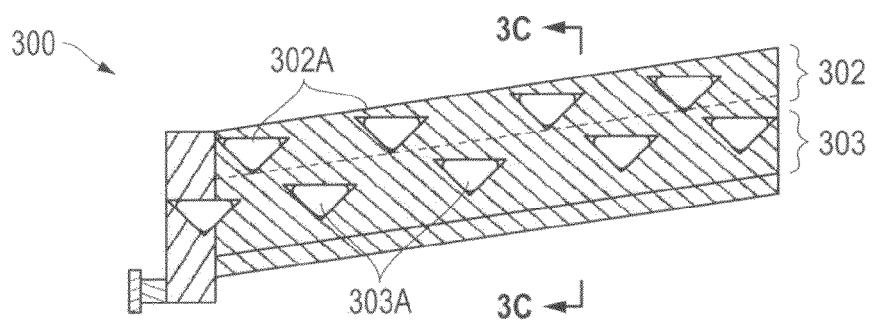
Figure 3C:
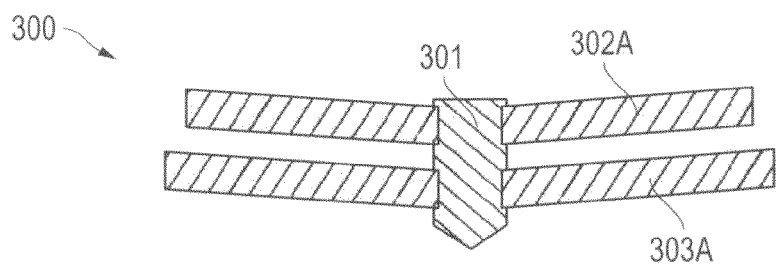

FIGS. 3A-3C depict various plan and/or sectional views of a wash zone collection apparatus in accordance with one or more embodiments of the invention. The wash zone collection apparatus so depicted minimizes turbulence and thus pressure drop in the rising vapor in three primary ways: by minimizing the deflection of vapor as it rises through the collection apparatus, by occluding less than 50% of the cross-sectional area of the column at any layer of the apparatus, and by not introducing any drag-inducing sharp edges in the vapor path.

FIG. 3A shows a plan view of the wash zone collection apparatus. The apparatus 300 includes one or more center channels or troughs 301. One or more layers of lateral troughs may be provided so as to be inclined towards the center trough(s) 301. A single layer comprising lateral troughs 303A is shown in the plan view of FIG. 3A.

FIG. 3B depicts a sectional view of the wash zone collection apparatus taken along Section 3B-3B in FIG. 3A. Two layers 302, 303 of lateral troughs are provided. Layer 302 comprises lateral troughs 302A and layer 303 comprises lateral troughs 303A. The lateral troughs 302A of layer 302 are positioned so as to be staggered laterally with respect to the lateral troughs 303A of layer 303. The plurality of lateral troughs in each layer may be substantially equal in width and each lateral trough in each layer may be spaced laterally from an adjacent trough in the same layer by a distance of about 1.0 to about 1.2 times the width of each lateral trough. Moreover, each layer of lateral troughs may be spaced vertically from an adjacent layer by a distance about equal to a distance between adjacent lateral troughs in the same layer.

The staggering of the lateral troughs of one layer with respect to the lateral troughs of another layer such that each lateral trough in each layer is spaced laterally from an adjacent trough in the same layer by a distance of about 1.0 to about 1.2 times the width of each lateral trough produces significant advantages over conventional slop wax collectors. In particular, the design described above causes vapor flowing upward through the gaps between adjacent lateral troughs in a lower layer to split on the bottom surface of a lateral trough in an immediately adjacent upper layer. This in turn directs liquid that has passed through the contacting structure toward a center line of the gap between adjacent troughs in an upper layer and thus onto the center axis of a lateral trough in the lower layer. Accordingly, more effective slop wax collection is achieved.

To further minimize pressure drop across the wash zone collection apparatus, the center channel or trough 301 as well as the lateral troughs 302A, 303A may comprise rounded or V-shaped bottoms. In an exemplary embodiment of the invention, at least the upper edges of each lateral trough may be curved with a radius of about 1 cm to about 2 cm about 60 degrees toward the center axis of the lateral trough. This design not only provides adequate stiffness but also produces the unexpected additional advantage of reducing pressure drop across the apparatus and reducing re-entrainment of liquid droplets deposited on the lower surfaces of the lateral troughs and forced upwards by the rising vapor. The rounding of the upper edges of the lateral troughs inward out of the vapor path induces the rising vapor to direct droplets falling out of the wash zone packing toward the center axis of the trough, which in turn allows a cross-sectional area occluded by each layer of lateral troughs to be less than about 50% of a cross-sectional area of the distillation column and the total plan area of the troughs to be less than 100% of the cross-sectional area of the column. Additionally, liquid residence time in the collection apparatus 300 is minimized by the narrowed V-bottomed surfaces and strong incline of the lateral troughs toward the central trough 301 as well as the incline of the central trough 301 toward an opening that provides for fluid communication with the recirculation subsystem. The rounded V-shape of the bottom surfaces of the lateral troughs also serves to minimize vapor drag.

As previously mentioned, a system according to one or more embodiments of the invention additionally comprises a feed inlet distributor that reduces or minimizes an amount of liquid entrained in a fluid feed stream fed to the distillation column. The gas velocity that will cause entrainment of a liquid droplet is proportional to the square of the droplet's diameter. The amount of liquid entrained in the vapor rising through the wash zone is dependent on the velocity of the vapor, which is a function of the vapor mass flow rate and specific volume, and the distribution of droplet sizes in the feed liquid. In general, the more finely atomized the feed liquid, the greater the level of entrainment.

Figure 4A:
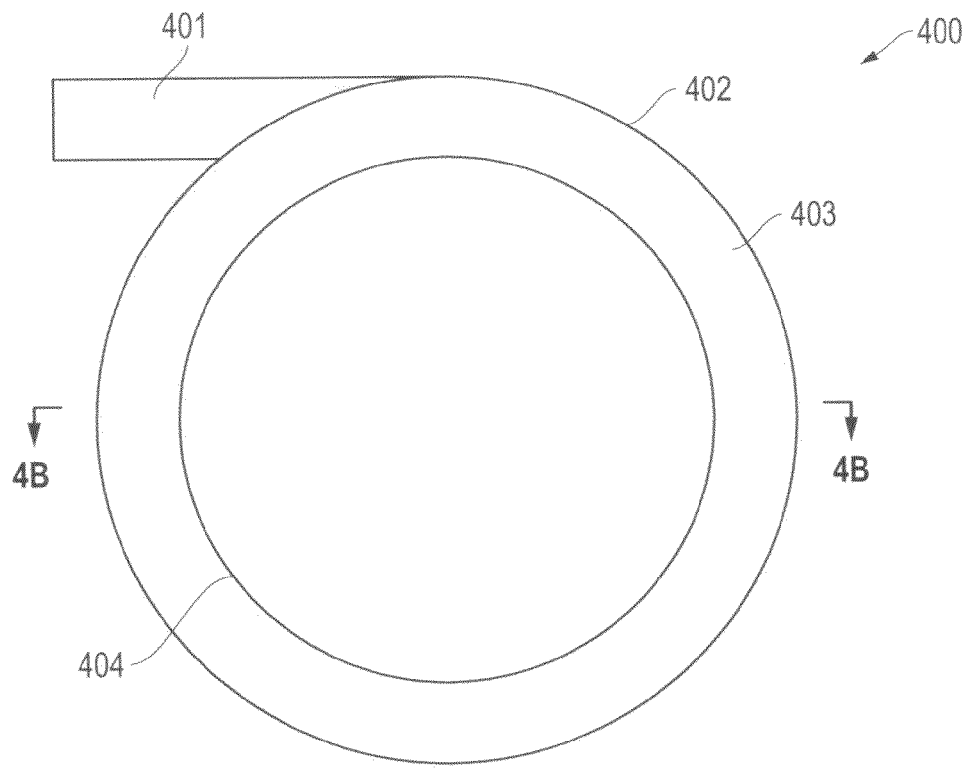
FIGS. 4A and 4B depict plan and sectional views, respectively, of a tangential feed inlet distributor in accordance with one or more embodiments of the invention.
Figure 4B:
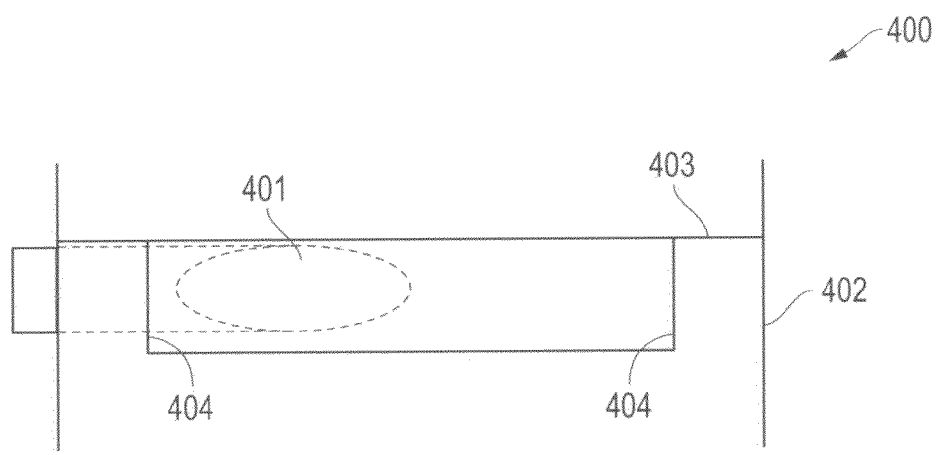

FIGS. 4A and 4B depict plan and sectional views, respectively, of a tangential feed inlet distributor 400 in accordance with one or more embodiments of the invention. The tangential feed inlet distributor 400 shown in FIGS. 4A and 4B distributes a fluid feed stream that enters the column through a tangential feed inlet 401 along a flow path substantially tangential to a circumferential wall 402 of the column. The feed distributor 400 comprises a horizontally disposed annular ring 403 extending around an entire circumference of the circumferential wall 402 of the distillation column, and a cylindrical skirt 404 connected to an inner edge of the annular ring 403 and extending downward therefrom. In certain embodiments of the invention, the annular ring 403 may extend from the circumferential wall 402 of the distillation column by a distance about equal to a diameter of the feed inlet 401 and the cylindrical skirt 404 may extend downward a distance equal to about 1.25 times the diameter of the feed inlet 401.

The horizontal annular ring 403, the cylindrical skirt 404, and the circumferential wall 402 of the distillation column together define an open-bottomed tunnel within the distillation column into which the fluid feed stream is injected or channeled via feed inlet 401. The tunnel temporarily segregates the incoming fluid from the vapor rising past the tunnel to allow the fluid to decelerate and the entrained liquid to separate. The tangential flow path of the fluid feed stream exploits centrifugal force and gravity to enhance gravimetric separation of liquid from the vapor.

Figure 5A:
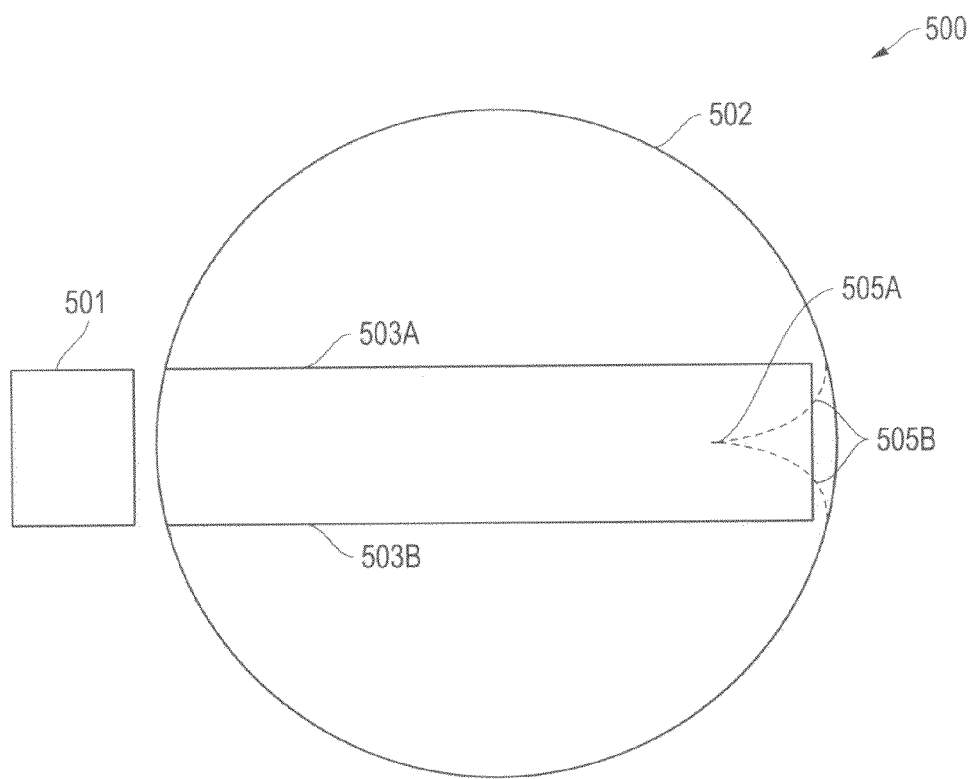
FIGS. 5A and 5B depict plan and elevation views, respectively, of a radial feed inlet distributor in accordance with one or more alternate embodiments of the invention.
Figure 5B:
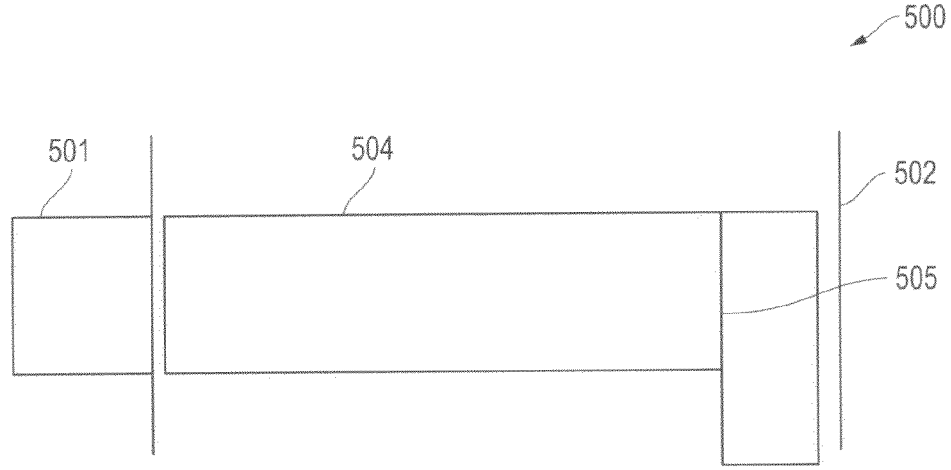

FIGS. 5A and 5B depict various views of a radial feed inlet distributor 500 in accordance with one or more alternate embodiments of the invention. In this embodiment, the feed inlet nozzle 501 is radial to the vessel rather than tangential. The radial feed inlet distributor 500 comprises a roof plate 504 that extends substantially across an entire diameter of the distillation column and a skirt comprising opposing walls 503A, 503B laterally spaced from each other about a distance equal to a diameter of the feed inlet 501 and extending downwards from the roof plate 504 about a distance equal to the diameter of the feed inlet 501. The opposing walls 503A, 503B of the skirt terminate prior to reaching a distal end of the circumferential wall 502 of the distillation column. For example, the opposing walls 503A, 503B may terminate a distance from the circumferential wall of the distillation column equal to about one half of the diameter of the feed inlet 501. A feed splitter or deflector 505 is provided in proximity to where the opposing walls 503A, 503B of the skirt terminate, the feed splitter 505 splitting the fluid feed stream bilaterally into two smaller fluid feed streams directed in opposing horizontal directions and along flow paths substantially tangential to the circumferential wall 502 of the distillation column.

The fluid feed stream is injected or channeled via radial feed inlet 501 into an open-bottomed tunnel defined by the roof plate 504 and the opposing walls 503A, 503B of the skirt. As such, the high velocity liquid in the vapor stream is constrained from spraying upward or laterally and a bulk portion of the liquid falls out of the vapor stream through gravimetric separation. The feed splitter 505 converts the radial flow path of the fluid feed stream into bilateral horizontal tangential fluid flow paths, thereby exploiting the vapor velocity to enhance liquid separation by centrifugal force.

In an embodiment of the invention, the feed splitter 505 may comprise a sharp-edged vertical bar 505A connected at an upper end to the roof plate 504 and extending downward therefrom a distance about 1.5 times a diameter of the feed inlet nozzle 501. The feed splitter 505 may further comprise symmetrically disposed deflector plates 505B, each plate being rolled to form a quarter of the circumference of a vertical cylinder having a height equal to that of the vertical bar 505A. One vertical edge of each deflector plate may be attached to the vertical bar 505A while the other vertical edge lies along the circumferential wall 502 of the column.

Conventional inlet distributors comprise various types of vanes and deflectors in the fluid feed stream path that exacerbate atomization of entrained liquid in the feed stream. Further, panels, plates or other devices provided in the path of the high-velocity vapor produce eddy currents in the flowing fluid. For every eddy in the downward direction, the velocity of the vapor elsewhere in the same horizontal plane must increase, thereby increasing the amount of entrained liquid. Moreover, structures disposed within the feed stream flow path convert the horizontal velocity of the feed into a vertical velocity component that can exacerbate entrainment of liquid in the rising vapor.

Feed inlet distributors according to embodiments of the invention are free of surfaces transverse to the feed fluid stream's tangential flow path and thereby avoid the atomization of entrained liquid droplets and the formation of eddy currents observed in conventional inlet distributors. The feed is allowed to travel tangentially along the circumferential wall of the column unobstructed by any surface that could shatter liquid droplets or deflect the vapor vertically and exacerbate liquid entrainment in the rising vapor. Feed inlet distributors according to embodiments of the invention are thus able to exploit the horizontal velocity of the vapor stream to separate liquid gravimetrically as it flows tangentially along the wall of the column.

Additionally, in conventional systems, the increase in the amount of entrained liquid in the vapor feed stream caused by impingement of the feed stream against surfaces in the fluid flow path often necessitates increased washing action in the wash zone, which in turn requires an increase in the amount of distillate that must be added to the wash oil circulation to maintain its effectiveness. However, feed inlet distributors according to embodiments of the invention eliminate this additional disadvantage of conventional systems Conventional wisdom in the art has heretofore advocated the installation of vanes of various shapes and orientations transverse to the fluid feed path with the stated objective being to establish uniformity of vertical velocity of the rising vapor below the wash oil collector. CFD modeling has been used to design inlet distributors and associated impingement surfaces that attempt to achieve a uniformity of distribution of the rising vapor. A significant drawback of such modeling is that it has focused only on the vapor phase of the fluid feed stream without regard to the liquid phase.

Applicants have determined that uniformity of the vapor flow prior to reaching the wash zone is irrelevant to wash zone performance for several reasons. First, the velocity profile of the vapor as it rises through the wash zone is determined more by the design of the wash oil collector than by the vapor velocity pattern below the collector. Second, with the high wash oil flow rate achieved by embodiments of the invention, minor variations in the velocity of vapor entering the wash zone packing are made more uniform by flow through the packing alone. Third, given the high liquid flow rates in the wash zone, the rising vapor is effectively washed despite any variations in vapor velocity below the packing.

Even assuming arguendo that feed inlet distribution subsystems according to embodiments of the invention are not capable of achieving as uniform a distribution of vapor velocities across the cross section of the column above the feed zone as is achieved in conventional designs, embodiments of the invention are still capable of providing essentially complete removal of entrained liquid. Applicants have determined that the uniformity of vapor distribution below the wash zone is inconsequential to removal of entrained liquid in the wash zone because the path of vapor flow through the wash oil collector has a far greater influence on the distribution of vapor into the wash zone packing than the velocity profile below the collector. Moreover, any potential adverse effect of non-uniform distribution of vapor leaving the feed zone is negated by the high wash oil flow rates capable of being maintained in embodiments of the invention, which ensure complete wetting of the wash zone packing and essentially complete removal of entrained material.

It should be noted that regardless of how well feed inlet distributors according to embodiments of the invention are capable of performing, some entrainment of liquid in the vapor rising from the feed zone is likely to occur. The recirculation subsystem according to embodiments of the invention recirculates the majority of the slop wax that has fallen from the wash zone back to a top of the wash zone for use as wash oil. Only a miniscule portion of the distillate may be combined with the recirculated slop wax prior to distribution to the top of the wash zone. As such, because distillate addition to the wash oil is negligible, significantly higher wash oil flow rates can be maintained as compared to conventional systems. Moreover, because the wash oil is at a higher temperature than the distilled liquid higher in the column, there is less condensation of the up-flowing vapor, and thus less loss of distillate yield. The end result is that the distillate product so obtained (e.g. HVGO product) contains negligible contamination by entrained material and is actually increased in yield. As an additional benefit, the modifications that must be made to conventional systems to arrive at embodiments of the invention do not require significant expense.

While the invention has been described with respect to a particular number of embodiments, those having ordinary skill in the art will understand that numerous other embodiments involving variations or modifications to the systems and processes described are also within the scope of the invention.

What is claimed is:

1. A process for improving quality and yield of one or more distillate products generated in a distillation column, the distillation column comprising a feed zone, a wash zone located above the feed zone, and a fractionation zone located above the wash zone, the wash zone having disposed therein a liquid/vapor contacting structure and a wash oil distributor for distributing wash oil to the contacting structure, the process comprising:
    feeding a fluid feed stream comprising both liquid and vapor phases tangentially or radially to the distillation column;
    providing a tangential entry feed distributor or a radial entry feed distributor within the distillation column, the tangential entry feed distributor and/or the radial entry feed distributor is free of any surface transverse to a flow path of the feed stream in order to reduce atomization of liquid in the feed stream;
    collecting slop wax falling from the contacting structure using a wash zone collection apparatus disposed in the wash zone;
    recirculating a portion of the slop wax to the wash oil distributor for distribution as the wash oil to the contacting structure; and
    producing a distillate product by condensation and collection of the vapor above the wash zone,
        wherein the fractionation zone comprises a distillate product collector for collecting the produced distillate product, and
        wherein one or more insulating materials is applied to an upper surface of a floor of the distillate product collector to reduce condensation of vapor on a bottom surface thereof.

2. The process of claim 1, wherein no external liquid is combined with the recirculated portion of the slop wax prior to distribution as the wash oil to the contacting structure.

3. The process of claim 1, further comprising:
    conducting a portion of the slop wax to an environment external to the distillation column, wherein the recirculated portion of the slop wax and the portion of the slop wax conducted to the external environment together constitute the amount of the slop wax withdrawn from the wash zone collection apparatus.

4. The process of claim 1, the process further comprising:
    combining a portion of the collected distillate product with the recirculated portion of the slop wax to form a combined stream;
    conducting the combined stream to the wash oil distributor; and
    distributing the combined stream as the wash oil to the contacting structure, wherein the collected distillate product in the combined stream constitutes less than about ten percent of the combined stream by weight.

5. A process for improving quality and yield of one or more distillate products generated in a distillation column, the distillation column comprising a feed zone, a wash zone located above the feed zone, and a fractionation zone located above the wash zone, the wash zone having disposed therein a liquid/vapor contacting structure and a wash oil distributor for distributing wash oil to the contacting structure, the fractionation zone comprises a distillate product collector for collecting the produced distillate product, the process comprising:
    feeding a fluid feed stream comprising both liquid and vapor phases tangentially or radially to the distillation column;
    providing a tangential entry feed distributor or a radial entry feed distributor within the distillation column, the tangential entry feed distributor and/or the radial entry feed distributor is free of any surface transverse to a flow path of the feed stream in order to reduce atomization of liquid in the feed stream;
    collecting slop wax falling from the contacting structure using a wash zone collection apparatus disposed in the wash zone;
    recirculating a portion of the slop wax to the wash oil distributor for distribution as the wash oil to the contacting structure;
    producing a distillate product by condensation and collection of the vapor above the wash zone;
    combining a portion of the collected distillate product with the recirculated portion of the slop wax to form a combined stream;
    conducting the combined stream to the wash oil distributor;

distributing the combined stream as the wash oil to the contacting structure, wherein the collected distillate product in the combined stream constitutes less than about ten percent of the combined stream by weight; and applying to an upper surface of a floor of the distillate product collector to reduce condensation of vapor on a bottom surface thereof.

6. The process of claim 5, wherein no external liquid is combined with the recirculated portion of the slop wax prior to distribution as the wash oil to the contacting structure.

7. The process of claim 5, further comprising:

conducting a portion of the slop wax to an environment external to the distillation column, wherein the recirculated portion of the slop wax and the portion of the slop wax conducted to the external environment together constitute the amount of the slop wax withdrawn from the wash zone collection apparatus.

\* \* \* \* \*